US008104432B2

(12) United States Patent
Silvis et al.

(10) Patent No.: US 8,104,432 B2
(45) Date of Patent: Jan. 31, 2012

(54) ANIMAL ENCLOSURE LATCH

(75) Inventors: Gary Silvis, Sardinia, OH (US); Jeffrey J. Ballman, Washington Court House, OH (US); Troy N. Brown, Washington Court House, OH (US)

(73) Assignee: The Mason Company, LLC, Leesburg, OH (US)

( * ) Notice: Subject to any disclaimer, the term of this patent is extended or adjusted under 35 U.S.C. 154(b) by 0 days.

(21) Appl. No.: 12/766,650

(22) Filed: Apr. 23, 2010

(65) Prior Publication Data

US 2011/0259277 A1 Oct. 27, 2011

(51) Int. Cl.
*A01K 1/03* (2006.01)
*E05B 9/02* (2006.01)

(52) U.S. Cl. .................... 119/481; 292/341.17; 292/194

(58) Field of Classification Search .................. 119/481; 292/340, 341.15, 341.17, 194, 230, 231, 292/234, 235, 236, 238, 200, DIG. 29; 49/394; 70/101, 135

See application file for complete search history.

(56) References Cited

U.S. PATENT DOCUMENTS 484,752 A * 10/1892 Hoffman ......................... 292/54
3,907,345 A 9/1975 Martini
4,062,575 A 12/1977 Robins
4,111,475 A 9/1978 McCormick et al.
4,135,747 A 1/1979 Melilli
4,167,281 A 9/1979 Spencer
4,198,085 A 4/1980 Schacter
4,254,975 A 3/1981 Miller
4,291,908 A 9/1981 Gittins, Sr.
4,592,578 A 6/1986 Martin
4,923,231 A 5/1990 Bergman et al.
4,932,693 A 6/1990 Schawartz
4,932,694 A 6/1990 Cater, Sr.
4,938,508 A 7/1990 Thomas
5,078,438 A 1/1992 Bieganski
5,097,796 A * 3/1992 Reimers ......................... 119/481
5,226,684 A 7/1993 De La Garza
5,275,450 A 1/1994 Winter
5,284,370 A 2/1994 Dunn
5,358,292 A 10/1994 Van Wiebe et al.
5,498,041 A 3/1996 Bezzerides et al.
5,593,141 A 1/1997 Cain et al.
6,036,245 A 3/2000 Schaefer
6,615,768 B2 9/2003 Fornes
7,207,141 B2 * 4/2007 Sullivan .......................... 49/169

* cited by examiner

*Primary Examiner* — Rob Swiatek
*Assistant Examiner* — Lisa Tsang
(74) *Attorney, Agent, or Firm* — Taft Stettinius & Hollister LLP

(57) ABSTRACT

Devices, apparatuses, systems and/or methods related to animal enclosure latches. Specifically, the disclosed devices, apparatuses, systems and/or methods relate to animal enclosure latches having an internal latch receptacle and an external latch receptacle, where the internal latch receptacle has a top downward-sloping portion to prevent animal collars and the like from becoming hooked, snagged and/or caught on the internal latch receptacle.

15 Claims, 5 Drawing Sheets

ANIMAL ENCLOSURE LATCH

BACKGROUND

It is desired that animal enclosure latch systems not cause a hazard to the enclosed animals or human caretakers. Specifically, available animal enclosure latch systems have been known to cause harm to animals. Such harm includes hanging and/or killing of animals.

Further, it is desired that animal enclosures include internal and external mechanisms to engage a latch to restrict enclosed animals from exiting the animal enclosure. Internal and external mechanisms to engage a latch may also allow a human caretaker to easily latch and/or unlatch an animal enclosure gate while the human caretaker is inside the animal enclosure.

Therefore, it would be desirable to have an animal enclosure latching device that is safe for animals and humans by minimizing the possibility of snagging animal collars, clothing and/or body parts, and that includes an internal and external latching mechanism.

SUMMARY OF THE DISCLOSURE

This disclosure is drawn to devices, apparatuses, systems and/or methods related to animal enclosure latches. Specifically, the disclosed devices, apparatuses, systems and/or methods relate to animal enclosure latches having an internal latch receptacle and an external latch receptacle, where the internal latch receptacle has a top downward-sloping portion to prevent animal collars and the like from becoming hooked, snagged and/or caught on the internal latch receptacle.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
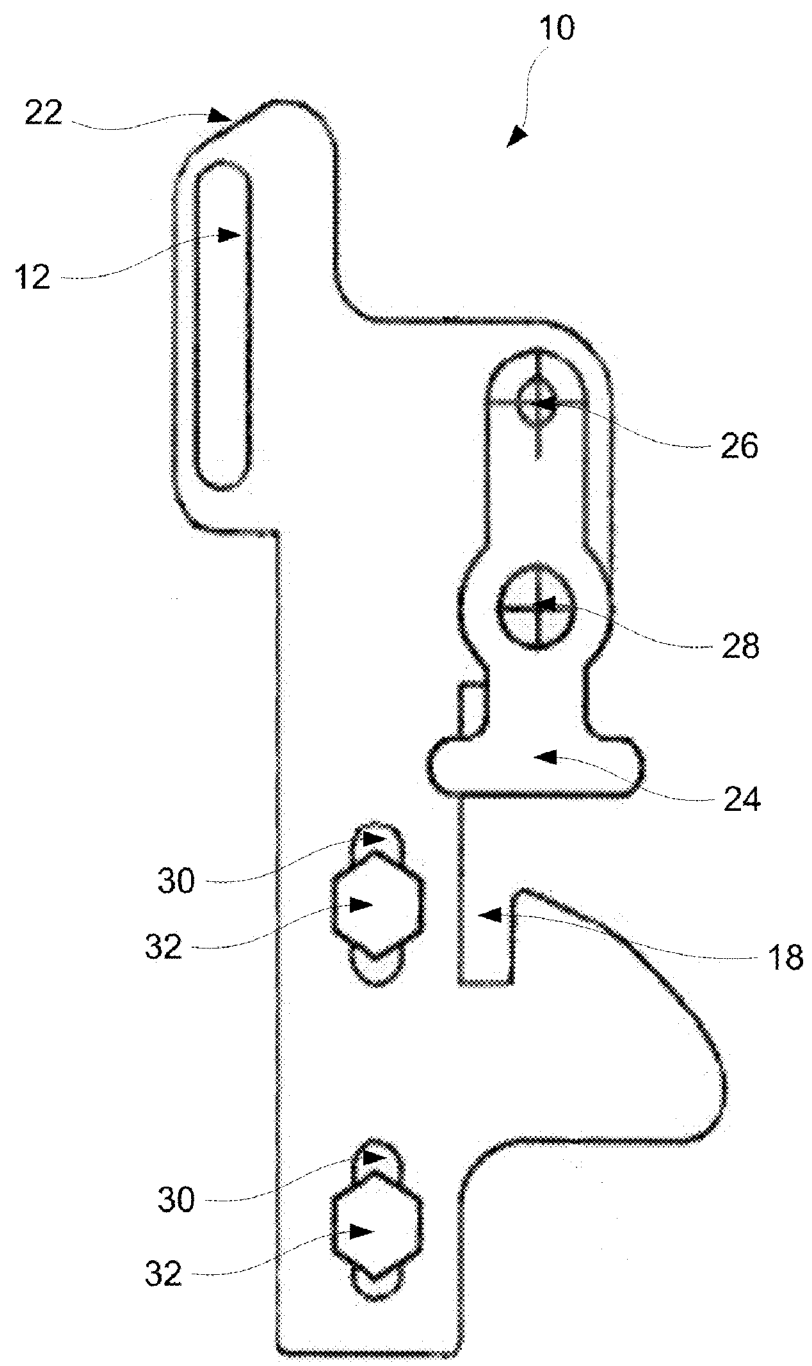
FIG. 1 is a diagram depicting an example embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In an exemplary embodiment, as generally depicted in FIG. 1, an animal enclosure latching device includes a strike plate 10 for engaging a latch 14. The strike plate 10 may include an internal latch slot 12 for receiving the latch when the latch is on the inside of the animal enclosure, and an external latch catch 18 for receiving the latch when the latch is on the outside of the animal enclosure. The strike plate 10 also may include a slanted segment 22 atop the internal latch slot 12. The slanted segment 22 may generally slant downward (e.g., toward the animal enclosure floor) from the strike plate 10 toward the inside of the animal enclosure.

Some embodiments may be configured such that the internal latch slot 12 and the external latch catch 18 may be located at differing heights on the strike plate 10. For example, the internal latch slot 12 may be located higher than the external latch catch 18. FIGS. 1-5 depict such embodiments. Another example provides that the internal latch slot 12 may be located lower than the external latch catch 18. Some examples may provide that the internal latch slot 12 may be located at substantially the same height as the external latch catch 18.

In some embodiments, the animal enclosure latching device may also include an external latch lock 24 for restricting movement of the latch when the latch is received and/or engaged by the external latch catch 18. The external latch lock 24 may be attached to the strike plate 10 at a pivot point 26 to allow the external latch lock 24 to pivot around to restrict or allow the latch from moving to and/or from the external latch catch 18. In some examples, the strike plate 10 may also include one or more strike plate lock holes to receive one or more locks (e.g., padlock, combination lock and the like). The external latch lock 24 may also include one or more latch lock holes 28 to receive a lock. In this manner, the same lock may couple the latch lock hole(s) 28 and the strike plate hole(s) together. This may provide for a more permanent and/or more effective locking mechanism to prevent an enclosed animal from getting out of the animal enclosure.

In some embodiments, the strike plate 10 may also include one or more fastener hole 30 for receiving fastener(s) 32. Fastener(s) 32 may be inserted into the fastener hole(s) 30 to couple the strike plate 10 to the animal enclosure. Example fasteners 32 may include nails, screws, and other similar fasteners.

While the strike plate 10 may be comprised of any metal material, exemplary embodiments provide that the strike plate 10 is comprised of stainless steel, galvanized steel, aluminum alloy and/or cast iron.

Figure 2:
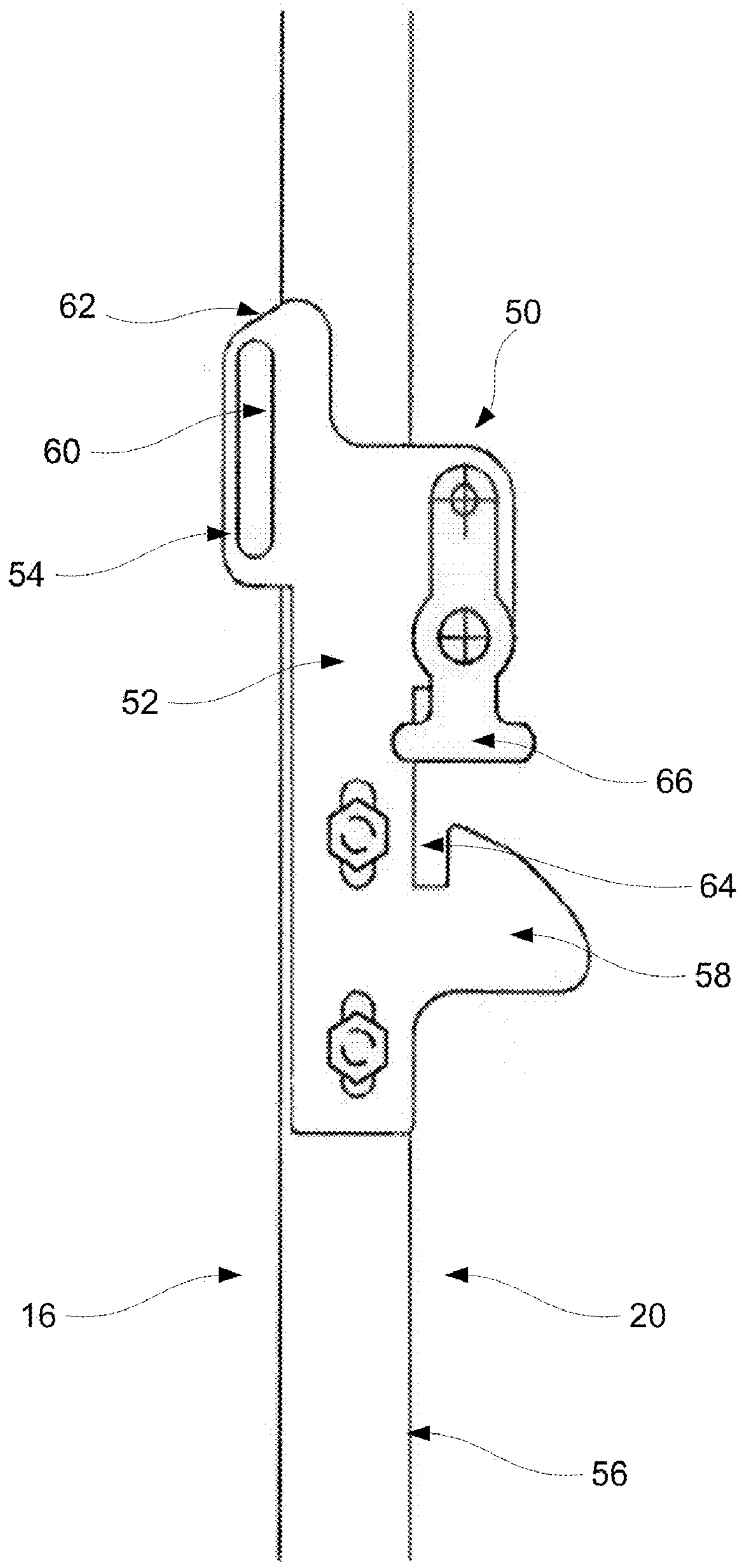
FIG. 2 is a diagram depicting another example embodiment of the present invention.
Figure 3:
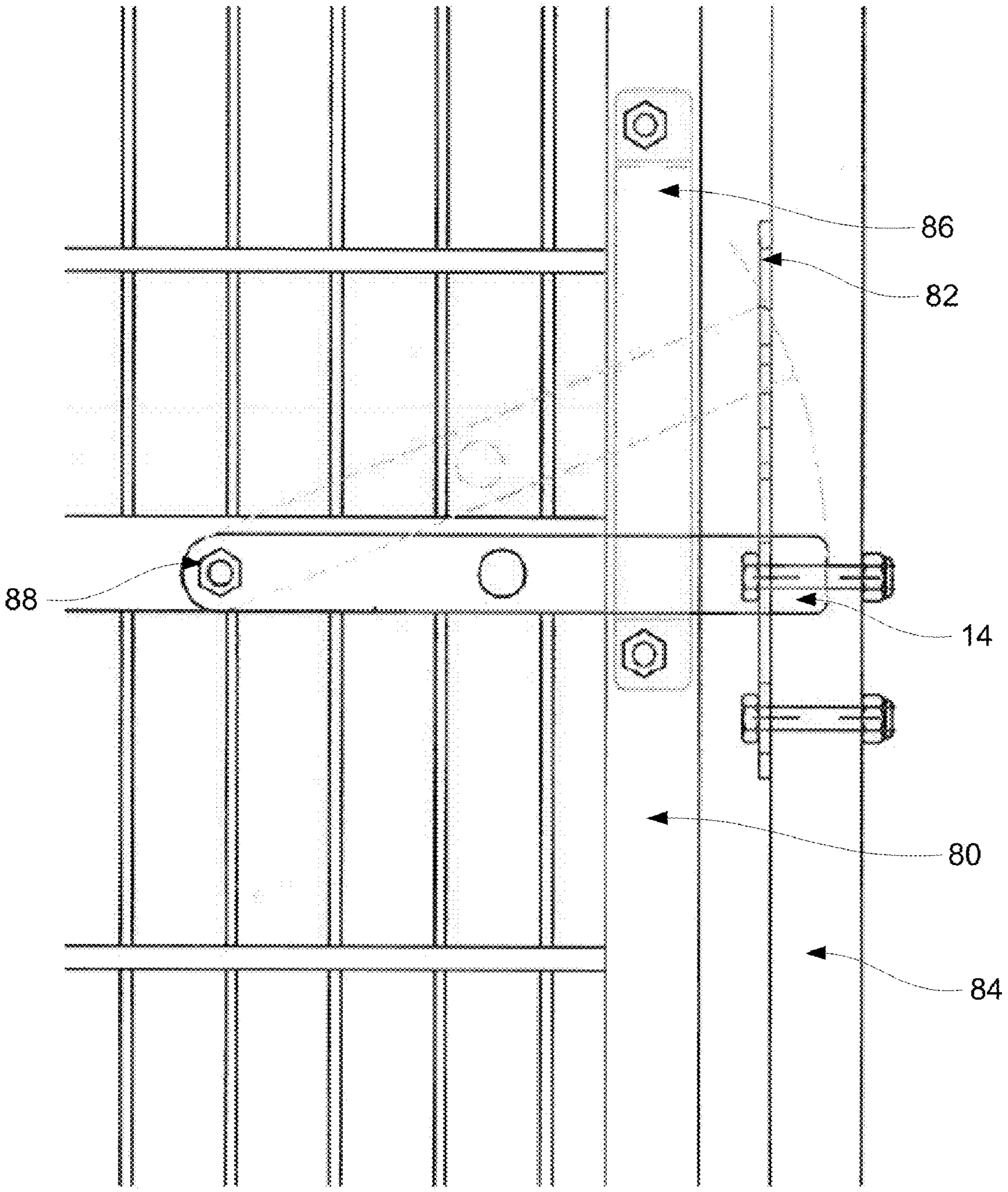
FIG. 3 is a diagram depicting yet another example embodiment of the present invention.
Figure 4:
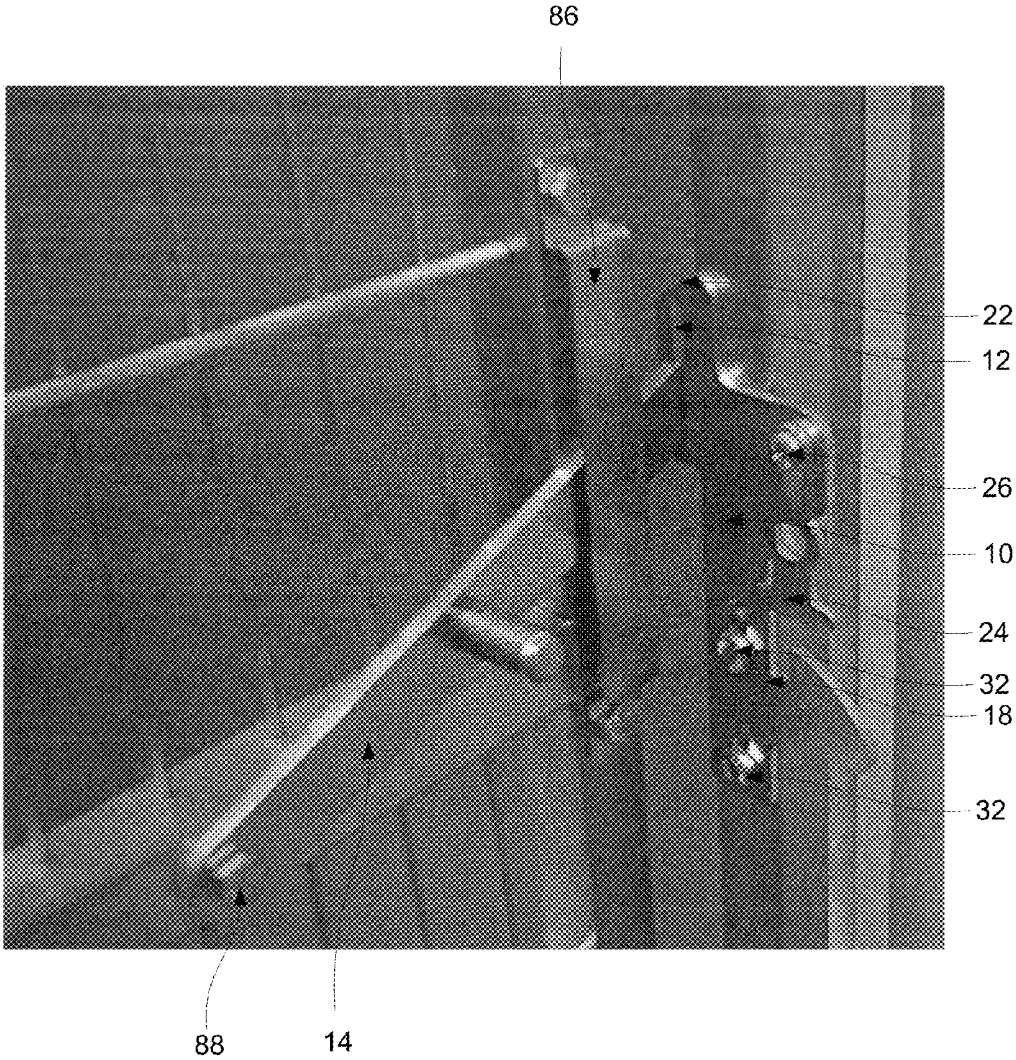
FIG. 4 is a diagram depicting a further example embodiment of the present invention.
Figure 5:
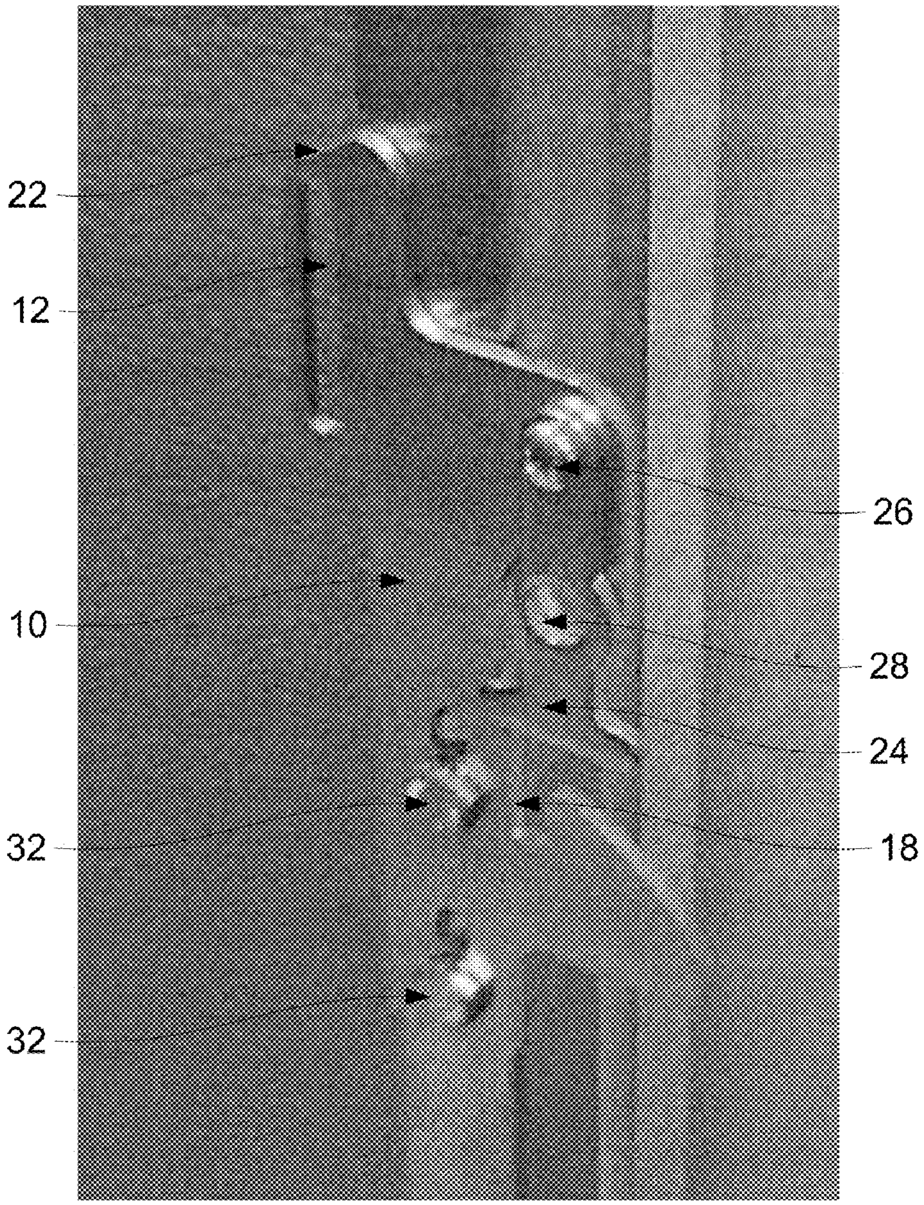
FIG. 5 is a diagram depicting even yet another example embodiment of the present invention.

In some embodiments, as depicted in FIG. 2, an animal enclosure latching device may include a strike plate 50. The strike plate 50 may include a coupling portion 52 for coupling the strike plate 50 to an animal enclosure 56, an internal flange 54 protruding from the coupling portion 52 toward the inside 16 of an animal enclosure, and an external flange 58 protruding from the coupling portion 52 toward the outside 20 of the animal enclosure 56. In such embodiments, the internal flange 54 may include a latch opening 60 adapted to receive a latch. The internal flange 54 may also include a downward-slanted portion 62 above the latch opening. The external flange 58 may include an external latch catch 64 for receiving the latch when the latch is on the outside 20 of the animal enclosure 56.

In some embodiments, the downward-slanted portion 62 above the latch opening 60 may be configured to prevent articles (e.g., animal collars and/or body parts) from becoming snagged or caught on the internal flange 54. In some examples, the downward-slanted portion 62 above the latch opening 60 may slant downward from the strike plate 50 toward the inside 16 of the animal enclosure.

Some examples may also include an external latch lock 66 for restricting movement of the latch when the latch is received by and/or engaged with the external latch catch. 64 The external latch lock 66 may be pivotally coupled to the strike plate 50.

In some embodiments, an animal enclosure latching system may include an animal enclosure gate 80 pivotally coupled to an animal enclosure, a latch 14 pivotally coupled to the animal enclosure gate 80, and a strike plate 82 coupled to the animal enclosure 84. The strike plate 82 may engage the latch 14 to substantially restrict the animal enclosure gate 80 from moving (e.g., pivoting). The strike plate 82 may include an internal latch slot for receiving the latch 14 on the inside of the animal enclosure 84, an external latch catch for receiving the latch 14 on the outside of the animal enclosure 84, and an external latch lock for restricting movement of the latch 14 when the latch 14 is received by the external latch catch. The strike plate 82 may also include a slanted segment atop the internal latch slot. The slanted segment may slant downward from the strike plate 82 toward the inside of the animal enclosure 84. Some examples may also include a latch guide 86 coupled to the animal enclosure gate 80. The latch guide 86 may guide the latch 14 as the latch 14 pivots about a latch pivot point 88.

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. An animal enclosure, comprising:

an animal enclosure gate positioned in an animal enclosure barrier, said gate and said barrier defining an inside wherein an animal is confined and an outside wherein a caregiver may access said animal enclosure;

a strike plate mounted on said barrier or said gate;

a latch coupled to said animal enclosure gate or said barrier, the strike plate further comprising:

an internal latch slot located on said inside of said animal enclosure, said internal latch slot adapted to receive said latch on said inside of said animal enclosure;

said internal latch slot having a top portion, said top portion comprising a slanted segment slanting downward from the strike plate toward the inside of the animal enclosure, said strike plate being mounted on said barrier or said gate of said enclosure such that no surface is created by said strike plate on said inside of said enclosure on which an animal collar could be caught or snagged; and an external latch catch adapted to receive the latch on the outside of the animal enclosure.

2. The animal enclosure of claim 1, wherein the internal latch slot is located higher than the external latch catch.

3. The animal enclosure of claim 1, wherein the internal latch slot is located lower than the external latch catch.

4. The animal enclosure of claim 1, wherein the internal latch slot is located at substantially the same height as the external latch catch.

5. The animal enclosure of claim 1, further comprising an external latch lock adapted to restrict movement of the latch when the latch is received by the external latch catch.

6. The animal enclosure of claim 5, wherein the external latch lock is pivotally coupled to the strike plate.

7. The animal enclosure of claim 5, wherein the strike plate further comprises at least one strike plate lock hole adapted to receive a lock; and wherein the external latch lock comprises at least one latch lock hole adapted to receive the lock.

8. The animal enclosure of claim 1, wherein the strike plate further comprises at least one fastener hole adapted to receive at least one fastener; and wherein the at least one fastener is inserted into the at least one fastener hole to couple the strike plate to the animal enclosure.

9. The animal enclosure of claim 8, wherein the at least one fastener includes at least one of a nail and/or a screw.

10. The animal enclosure of claim 1, wherein the strike plate is comprised of at least one of stainless steel, galvanized steel, aluminum alloy and/or cast iron.

11. An animal enclosure, comprising:

an animal enclosure gate positioned in an animal enclosure barrier, said gate and said barrier defining an inside wherein an animal is confined and an outside wherein a caregiver may access said animal enclosure;

a strike plate comprising a coupling portion adapted to couple the strike plate to said animal enclosure;

an internal flange protruding from the coupling portion toward the inside of said animal enclosure, the internal flange having a latch opening adapted to receive a latch, the internal flange further having a downward-slanted portion above the latch opening which slants downward from the strike plate toward the inside of the animal enclosure, said internal flange being mounted on said barrier or said gate of said enclosure such that no surface is created by said internal flange on said inside of said enclosure on which an animal collar could be caught or snagged; and an external flange protruding from the coupling portion toward the outside of the animal enclosure, the external flange having an external latch catch adapted to receive the latch.

12. The animal enclosure of claim 11, further comprising:

an external latch lock adapted to restrict movement of the latch when the latch is received by the external latch catch.

13. The animal enclosure of claim 12, wherein the external latch lock is pivotally coupled to the strike plate.

14. An animal enclosure, comprising:

an animal enclosure gate positioned in an animal enclosure barrier, said gate and said barrier defining an inside wherein an animal is confined and an outside wherein a caregiver may access said animal enclosure, wherein said animal enclosure gate is pivotally coupled to said animal enclosure barrier;

a latch pivotally coupled to the animal enclosure gate or animal enclosure barrier;

a strike plate coupled to the animal enclosure barrier or animal enclosure gate, the strike plate adapted to engage the latch, the strike plate comprising:

an internal latch slot adapted to receive the latch on the inside of the animal enclosure;

a slanted segment atop the internal latch slot, the slanted segment slanting downward from the strike plate toward the inside of the animal enclosure, said strike plate being mounted on said barrier or said gate of said enclosure such that no surface is created by said strike plate on said inside of said enclosure on which an animal collar could be caught or snagged;

an external latch catch adapted to receive the latch on the outside of the animal enclosure; and an external latch lock adapted to restrict movement of the latch when the latch is received by the external latch catch.

15. The animal enclosure of claim 14, further comprising:

a latch guide coupled to the animal enclosure gate, the latch guide adapted to guide the latch as the latch pivots about a latch pivot point.

* * * * *